United States Patent [19]

Singh

[11] Patent Number: 4,912,732
[45] Date of Patent: Mar. 27, 1990

[54] AUTOMATIC STEAM GENERATOR CONTROL AT LOW POWER

[75] Inventor: Gurdip Singh, Vernon, Conn.

[73] Assignee: Combustion Engineering, Inc., Windsor, Conn.

[21] Appl. No.: 181,513

[22] Filed: Apr. 14, 1988

[51] Int. Cl.[4] .................................................. G21C 7/32
[52] U.S. Cl. ..................................... 376/211; 376/216; 376/241
[58] Field of Search ............... 376/210, 211, 215, 216, 376/217, 241, 297; 60/607

[56] References Cited

U.S. PATENT DOCUMENTS

| | | | |
|---|---|---|---|
| 3,255,084 | 6/1966 | Doroszlai | 376/216 |
| 4,042,813 | 8/1977 | Johnson | 235/151.21 |
| 4,064,698 | 12/1977 | Stern | 60/664 |
| 4,064,699 | 12/1977 | Martz | 60/664 |
| 4,075,059 | 2/1978 | Bruno et al. | 376/216 |
| 4,080,251 | 3/1978 | Musick | 376/216 |
| 4,104,117 | 8/1978 | Parziale et al. | 376/216 |
| 4,187,144 | 2/1980 | Mueller et al. | 376/216 |
| 4,330,367 | 5/1982 | Musick | 376/245 |
| 4,424,186 | 1/1984 | Cook | 376/211 |
| 4,551,796 | 11/1985 | Singh | 364/148 |
| 4,777,009 | 10/1988 | Singh | 376/211 |

OTHER PUBLICATIONS

G. Singh, Microprocessor System for Low Power Feedwater Control, 4/9–4/12/85, pp. 1–7.

Primary Examiner—Donald P. Walsh
Attorney, Agent, or Firm—Chilton, Alix & Van Kirk

[57] ABSTRACT

The steam generator water level, the feed water temperature, and the reactor power are continuously measured and a level signal (76), a temperature signal (78), and a power signal (80) commensurate with these measurements are respectively generated. From the power signal and the temperature signal, a target flow signal (84) is generated corresponding to the feedwater flow rate that would produce a stable steam generator water level at the steady state condition of the power signal and the temperature signal. The level signal is compared to a level signal setpoint (54) and a resulting level error signal (86) is generated. The level error signal is adjusted by a gain factor (88) that is dependent on the temperature signal to produce an adjusted level error signal (90). The feedwater flow through the bypass valve is then controlled in response to the target flow signal (84') and the adjusted level error signal. In a preferred implementation of the invention, the transition between low power control using the bypass valve and high power control using the main feed water valve is accomplished by generating a main valve position signal (118), and generating an enable signal (124) when the power signal is within a desired transition power range. When the power is in the transition range, the feedwater flow through the bypass valve is ramped down or up in response to the target flow signal, the adjusted level error signal, and the main valve position signal, as the main feedwater flow increases or decreases.

31 Claims, 7 Drawing Sheets

AUTOMATIC STEAM GENERATOR CONTROL AT LOW POWER

BACKGROUND OF THE INVENTION

The present invention relates to nuclear power and particularly to the control of recirculating steam generators in pressurized water nuclear steam supply systems. More specifically, the present invention is directed to automatic low power water level control for such steam generators.

A major contributing factor to nuclear plant unavailability is both high and low steam generator level trips during low power operation. This problem is particularly acute during plant start-up, when the operators have had relatively little experience in steam generator level control. The frequency of trips tends to fall off as the operator gains experience and confidence. However, because plants are often base-loaded, the operators have little opportunity to maintain their skills through varied actual operating experience at low power. Rather, training for low power operation is often dependent on plant simulators. Unfortunately, the ability of many of the operator training simulators today to accurately predict steam generator level dynamics, especially during low power operation, is rather limited. The lack of detailed process simulations in all but the most sophisticated simulators has prevented an accurate representation of this phenomena.

As a result, even experienced operators of pressurized nuclear power plants, have encountered difficulties in avoiding nuclear reactor trips during low power operation. This difficulty arises in part from the counter-intuitive behavior of the plant in response to control actions which may be taken by the operator. In particular, the steam generator water level often initially decreases when the operator increases the feed water flow to the steam generator.

In co-pending U.S. patent application No. 879,893, filed June 30, 1986, now U.S. Pat. No. 4,777,009 and assigned to the owner of the present patent application, an automatic steam generator feedwater control system for a full power operating range is disclosed and claimed. The disclosure of said copending application is hereby incorporated by reference. Such a system, although effective, is not well adapted for economical retro-fitting in existing nuclear power plants because of the delicate transitions among three power-operating regimes: a low power regime, typically in the range of 0–15% power, an intermediate regime in the range of 15–50% power, and a high power regime in the range of 50–100% power.

In the system of the '009 patent, the steam generator water level is controlled as a function of a flow demand signal wherein the feedwater pump speed demand is constant at low power and is modulated by the flow demand signal at intermediate and high power; the bypass valve position is modulated by the flow demand signal at low power, closed at intermediate power and open at high power; and the main valve position is closed at low power and modulated by the flow demand signal at intermediate and high power. The measured flow demand signal is first processed by an adaptive network in which the control coefficients are functions of the reactor power.

SUMMARY OF THE INVENTION

It is an object of the present invention to provide a low power automatic steam generator control system which may be readily and economically back-fit into a typical pressurized water nuclear power plant having one or more recirculating steam generators.

It is a further object that the low power control system be easily switched over to or from the existing full power control system of the plant when the power level passes through a predetermined transition range.

The present invention accomplishes these objectives while essentially eliminating steam generator level scrams at low power and eliminating continuous manual control at low power. It uses hardware and digital techniques that have been proven reliable, and that are cost-effective to a utility with respect to reasonable payback, easy installation and maintenance, and improved plant availability.

In accordance with the method of the present invention, the steam generator water level, the feed water temperature, and the reactor power are continuously measured and a level signal, a temperature signal, and a power signal commensurate with these measurements are respectively generated. The level signal is compared to a level signal setpoint and a resulting level error signal is generated. The level error signal is adjusted by a gain factor that is dependent on the temperature signal to produce an adjusted level error signal. Preferably the power signal is modified by the temperature signal, to produce a target flow signal corresponding to the feedwater flow rate that would approximate a stable steam generator water level at the steady state condition of the power signal and the temperature signal. The feedwater flow through the bypass valve is then controlled in response to the target flow signal and the adjusted level error signal.

In a preferred implementation of the invention, the transition between low power control using the bypass valve and high power control using the main feed water valve is accomplished by generating a main valve position signal, and generating an enable signal when the power signal is within a desired transition power range. When the power is in the transition range, the feedwater flow through the bypass valve is ramped down or up in response to the target flow signal, the adjusted level error signal, and the main valve position signal, as the main feedwater flow increases or decreases.

A BRIEF DESCRIPTION OF THE DRAWINGS

DESCRIPTION OF THE PREFERRED EMBODIMENT

Figure 1:
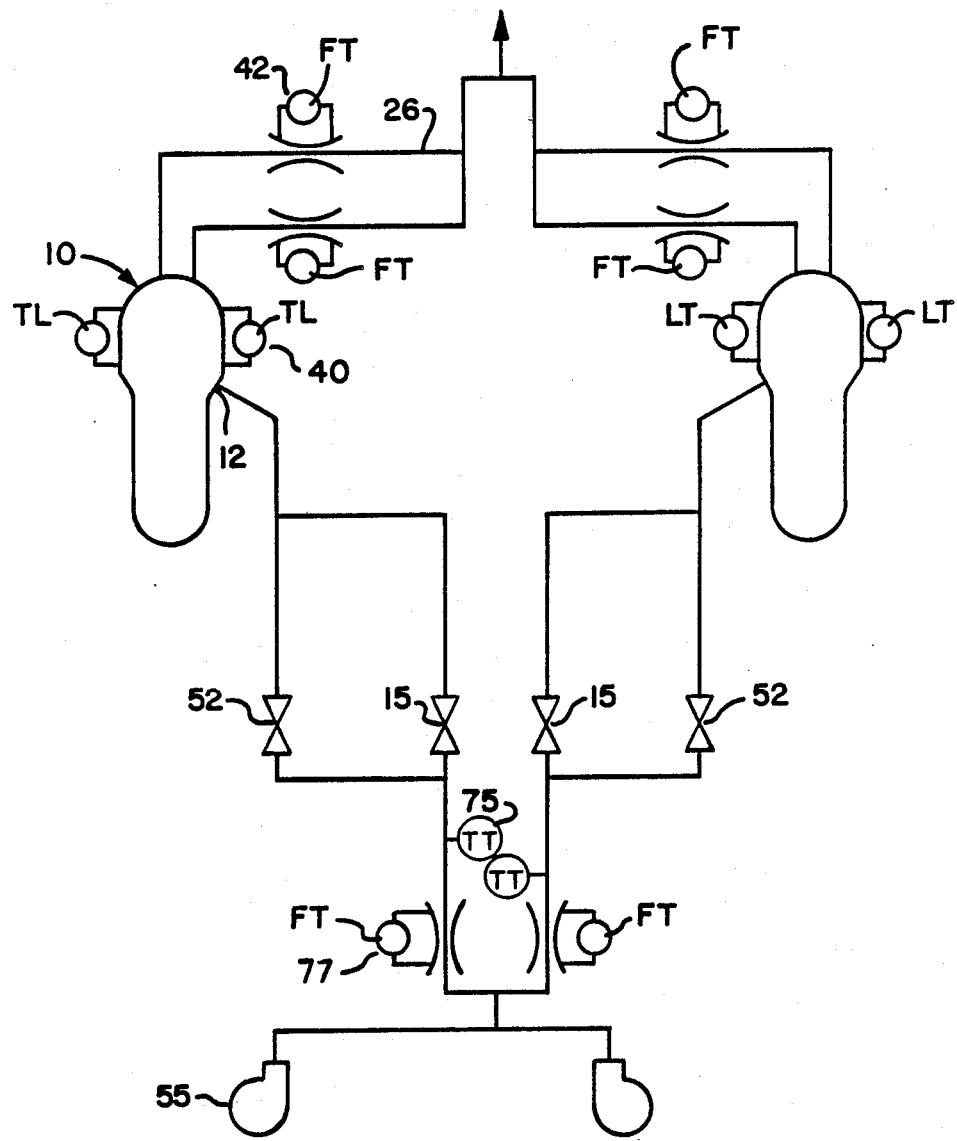
FIG. 1 is a schematic partial showing of the basic feedwater flow path in a nuclear steam supply system employing two steam generators.
Figure 2:
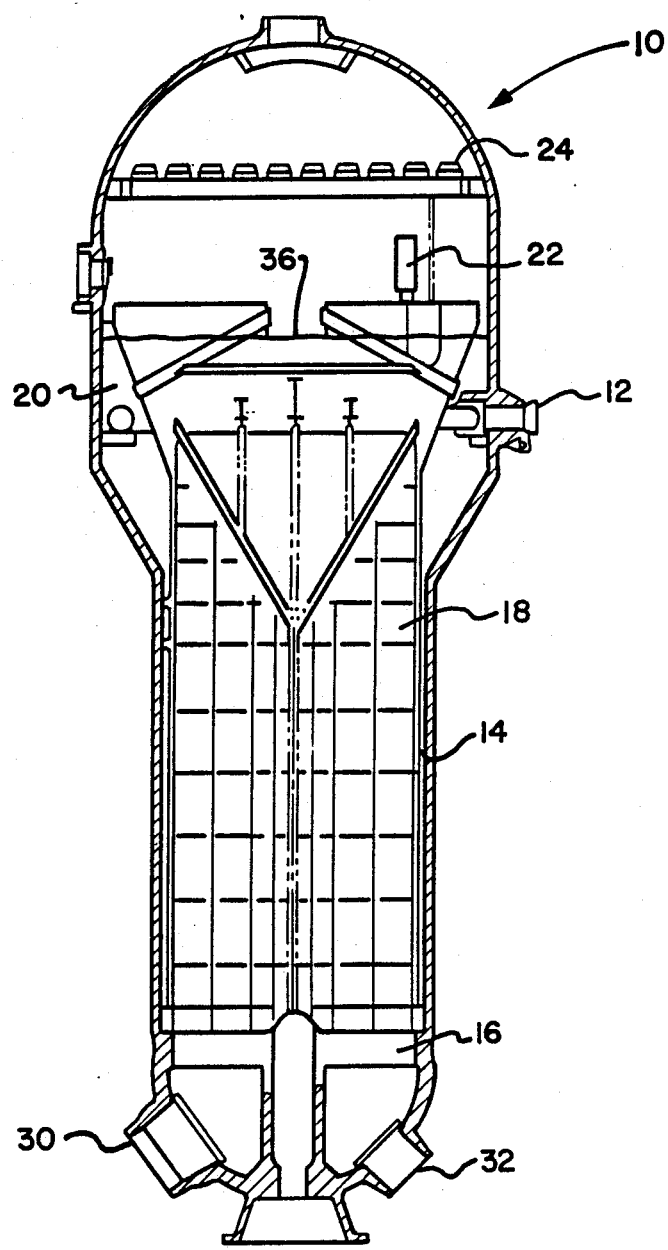
FIG. 2 is a schematic view of a recirculating nuclear steam generator.

FIGS. 1 and 2 are schematic illustrations of a typical recirculating steam generator 10. Feedwater is, under normal operating conditions, delivered to the generator via the downcomer nozzle 12 and flows into the downcomer 14 where it mixes with the recirculating saturated liquid. A downcomer, or bypass, valve 15 is located upstream of nozzle 12. The bypass and recirculating flows pass through the downcomer and enter the tube bundle region 16 at the bottom of the generator. As the fluid rises through the tube bundle 18, it absorbs heat from the primary loop, and exits the bundle region as a two-phase fluid. It then flows upwardly through the riser region 20 to the separators 22. The separators removed the liquid from the steam, returning the saturated liquid to the downcomer 14 and allowing the steam to rise to the dryers 24. The steam then exits the steam generator 10 and enters the main steam line 26.

As is well known in the field of nuclear power, the nuclear reactor (not shown) and the associated piping to and from the steam generator are usually referred to as the primary system. The reactor vessel and associated piping contain the primary coolant volume. The hot leg of the reactor contains water which has been heated by the reactor and which enters the steam generator through inlet nozzle 30. The steam generator output nozzle 32 returns water from the steam generator through the cold leg piping to the reactor vessel.

The recirculation process which in the steam generator 10 is sustained by the imbalance in the hydraulic heads of fluid in the downcomer 14 and in the tube bundle 18 and riser region 20. During high power operation, the difference in these driving heads is significant and leads to relatively stable operation. As the power is dropped, however, the amount of boiling is reduced in the tube bundle 18, causing a reduction in the quality of the fluid and thus an increase in its density. This, in turn, reduces the amount of driving head which, in turn, reduces the amount of recirculation. As this occurs, the generator 10 approaches the condition of a manometer where the hydraulic head of the downcomer 14 and the hydraulic head of the riser 20 and tube bundle 18 approach each other. Under these conditions, the downcomer water level becomes very difficult to control.

The normal water level in the steam generator is indicated at 36. The instrumentation for water level measurement is conventional and is indicated in FIG. 1 at 40. Steam flow is measured at, for example, 42. Feedwater temperature is measured at 75 and total feedwater flow is measured at 77.

In addition to the downcomer bypass flow through nozzle 12, feedwater is also supplied to steam generator 10 through a main feedwater valve 52. The main feedwater valve 52 is located upstream of nozzle 12, and as a higher capacity, typically 100 per cent of rated power, than that of bypass valve 15. The feedwater pumps 55 deliver the total feedwater flow through total flow transmitter 77, which can be divided between the main and bypass feedwater valves 52, 15 respectively.

A principal objective of the steam generator water level control system is to prevent the water level from rising too high in which case water may be carried out through the main steam nozzle 26, or dropping too low, in which case the pressure balance between the downcomer and tube bundle becomes unstable or, in the worst situation, the steam generator dries out. The water level is controlled primarily by regulating the feedwater flow through nozzle 12 by modulation of the settings of valves 15 and 52, and by varying the speed of pumps 55.

Figure 3:
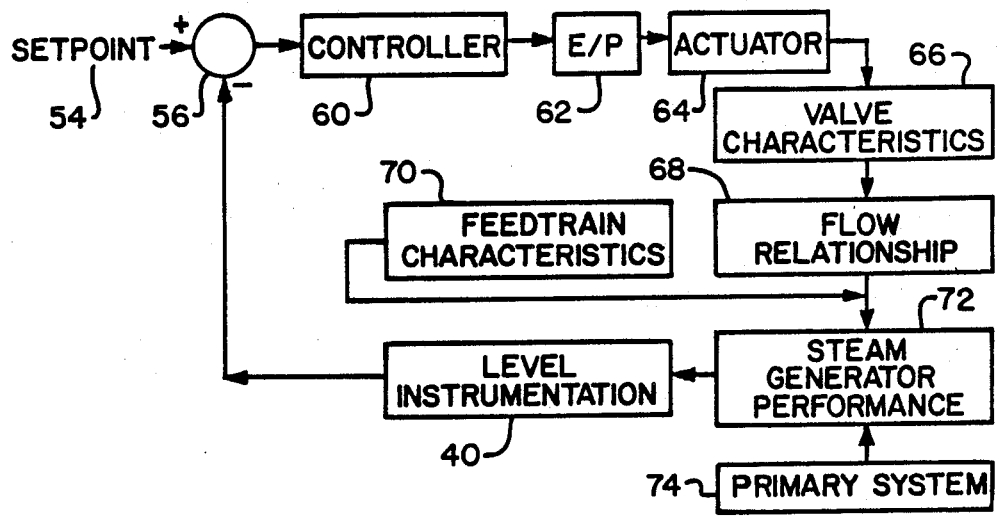
FIG. 3 is a general block diagram of a feedwater flow and steam generator water level control loop.

FIG. 3 illustrates a generalized strategy for regulating feedwater flow to control steam generator water level. A set point signed 54, representing the desired water level, is a first input to a comparator 56. The difference between the setpoint 54 and the actual steam generator water level, as provided by level instrumentation 40, is outputted from comparator 56 and fed to a controller 60. Controller 60 generates an electrical control signal which, after suitable processing to convert from electric to pneumatic actuation is delivered to one or more valve actuators 64. Each actuator operates a valve or the like, having characteristics as represented at 66. The response to the system is influenced by flow relationships, as represented at 68, and by the feedtrain characteristics, as represented at 70. Both the individual flow relationship 68, as influenced by the valve characteristics, and the feed train characteristics 70 determine the steam generator performance represented at 72. Steam generator performance is also influenced by the operating parameters and design of the primary system 74. The changes in the steam generator performance 72 as a result of the actuation of the valve are measured by the level instrumentation 40 and the signal is returned to the comparator 56 to complete the closed control loop.

Figure 4:
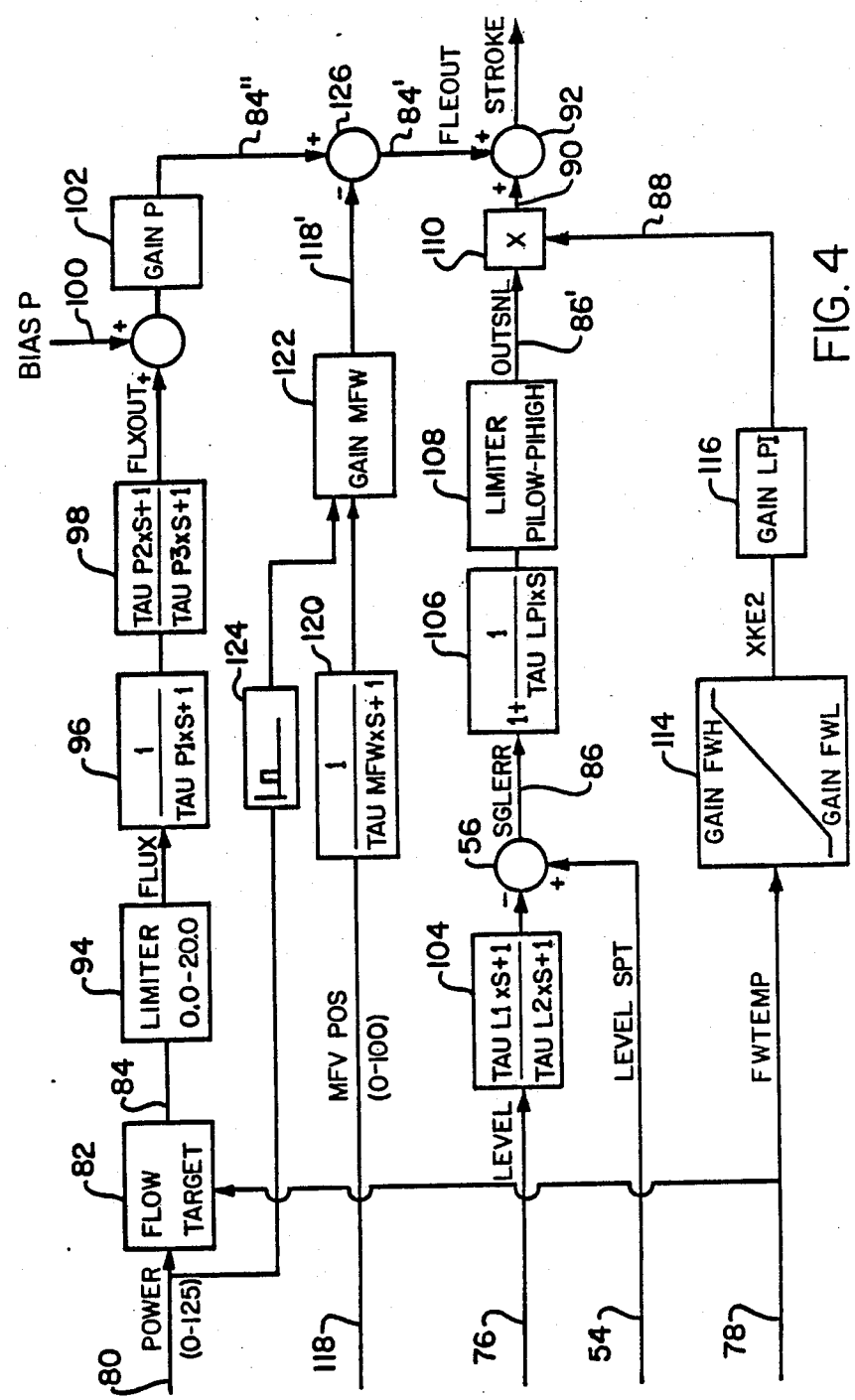
FIG. 4 is a functional diagram illustrating the low power automatic feedwater control system in accordance with the present invention.
Figure 6:
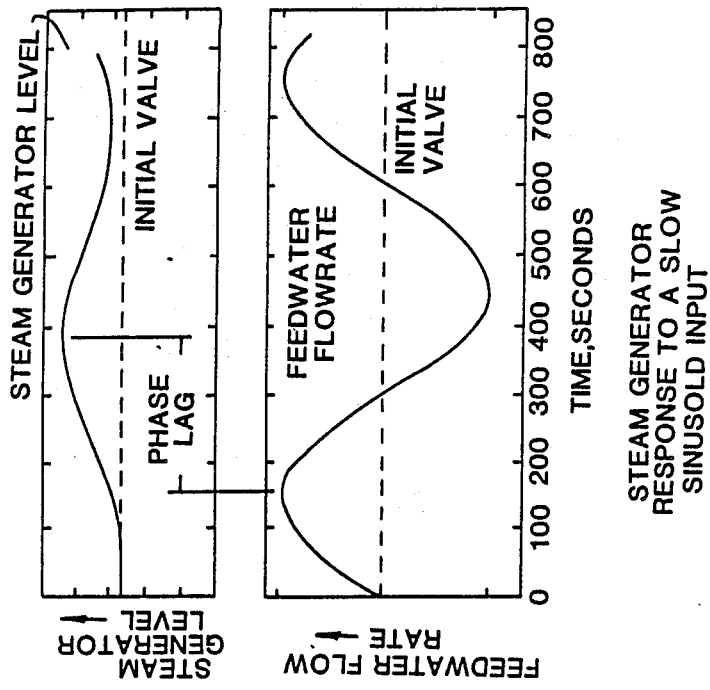
FIG. 6 is a graph showing steam generator response to a slow sinusoid change in feedwater flow for the steam generator represented by FIG. 5.

FIG. 4 is a functional block diagram of the automatic low power steam generator feedwater control system of the present invention. In the following description, it should be appreciated that the invention comprises apparatus and method for accomplishing novel control techniques. The particular components necessary to implement these techniques are known in the general art of control engineering, but the particular variables used in the control coefficients, and the manner in which these variables are employed, are novel. Accordingly, where only method steps are described, the associated hardware is either conventionally found in nuclear power plant, or the selection thereof is self-evident from the function it is to perform.

The three-element control system according to the invention utilizes as inputs, the steam generator downcomer level 36 as measured by instrument 40, the feedwater temperature as measured by instrument 75, and the nuclear reactor power, as typically measured by ex-core neutron detectors situated around the nuclear reactor vessel (not shown).

From the power signal 80 a target flow signal 84 is generated in functional block 82. This target flow signal 84 can depend on power alone, but preferably also depends on the temperature signal 78. The target signal 84 corresponds to the feedwater flow rate that would produce a stable steam generator water level if the steam generator were in a steady state condition at the power level represented by the power signal 80, and preferably with a feedwater temperature represented by the temperature signal 78. As will be described more fully below, the target flow signal 84 is, preferably after further processing, delivered to a summer 92 which actuates, and controls the stroke of, the bypass or downcomer feedwater control valve 15.

The level signal 76 is imposed on the comparator 56, where the difference between the level signal 76 and the level set point 54 generates a level error signal 86. The level error signal 86 is preferably further processed, as will be described below, to reduce the level error signal 86' which is in turn adjusted by a gain factor signal 88 that is dependent on the temperature signal 78. The resulting adjusted level error signal 90 is delivered to the summer 92 and, in combination with the target flow signal 84', regulates the bypass feedwater valve.

In the preferred implementation of the invention, the flow estimate in functional block 82 can be derived from the simple observation that ideally, the reactor power, such as reactor flux F, will equal the mass flow rate $w_f$ of the feedwater fluid, multiplied by the enthalpy change of water from the fluid to the vapor state. Symbolically, this can be represented by, $w_f(h_g - h_f) = F$. At a given pressure, the value of $h_g$ is essentially constant, whereas the value of $h_f$ is a function of the temperature. Thus, the target flow rate $$w_f = K \cdot F / (K_2 - h_f(T_f))$$

is proportionately dependent on the power signal 80 and is functionally dependent on the temperature signal 78, in accordance with a relationship for $h_f(T_f)$ that is readily obtained from standard thermodynamic tables for water. This relationship or simpler forms can be used to define the target flow rate.

In a typical embodiment, the low power operating regime spans the range of zero to 15% of the rated power of the steam generator, although the exact range is not critical to the present invention. On the assumption, however, that the low power regime spans the range of zero to 15%, and the high power regime spans the range of 15-100%, it is desirable that the target flow signal 84 be limited as in functional block 94, to a value corresponding to a range of power between zero and about 20%. This limit is preferably slightly greater than the upper end of the low power regime and would not be expected to exceed twice the range of the low power regime. The upper end of the low power regime is typically considered to be the reactor power level corresponding to full capacity flow through the feedwater bypass valve, and in most plants is about 15% of full power flow but can in some plants approach 20%. The target flow signal 84 as limited is then passed through a high frequency filter 96 and a lead lag circuit 98, is subjected to a bias signal 100 determined when fine tuning the system after installation, and passed through a gain circuit 102 from which it is delivered as signal 84' to the summer 92. The filter 96 and the lead lag circuit 98, which will hereinafter be referred to as the first adaptive network, preferably have functional forms in which the LaPlace transforms have co-efficients which are functions of the power signal 80. These co-efficients are represented in FIG. 4 by TAUP1 TAUP2, and TAUP3.

Preferably, the level signal 76 is passed through a lead lag network 104 before delivery to the comparator 56, and the resulting level error signal 86 is passed through a proportional-integral network 106 and then through a level error signal limiter 108. The lead lag circuit 104 will hereinafter be referred to as the second adaptive network, and the P/I circuit 106 will be referred to as the third adaptive network. Both the second and third adaptive networks preferably have the co-efficients such as TAUL1, TAUL2, and TAULP1, which depend on the level signal 76. The limiter 108 limits the error signal value 86 to fall within the permitted level range of low power operation. The limited error level signal 86' is then adjusted by the gain signal 88, by a simple multiplicative factor in a multiplier 110, before being delivered as an adjusted error level signal 90 to the summer 92.

The gain signal 88 is generated in accordance with a function generator 114, with the temperature signal 78 as the variable. The precise form of the functional dependence can vary somewhat, but in general, the gain factor represented by signal 88 should increase for increasing feedwater temperature. As shown in functional block 114, the functional form at the lower most and highest temperatures may be substantially constant values, but in general, the overall dependence of the gain factor on feedwater temperature, should be a commensurate increase. The magnitude of the gain signal 88 can be adjusted during fine tuning, in a conventional circuit represented by functional block 116.

Conceptually, the control system of the present invention matches the long term feedwater flow rate requirements to the reactor power. This is to allow anticipation of the steam generator feedwater flow rate requirements when reactor power is being adjusted. The compensation networks are tuned such that when power is increased, the feedwater flow rate is initially less than the steam flow rate. The underfeeding allows a reduction of mass inventory in the steam generator to match the reduced mass inventory required at higher powers. When reactor power is reduced, the mass inventory is increased through overfeeding.

The foregoing description is directed to the low power feedwater control aspect of the present invention. Typically, the need for automatic control at low power arises after a plant has been shut down and is returning to power. The initial increase from zero power is by manual control, and the low power automatic control system is switched on at a very low power level, typically 1 or 2%.

In a further embodiment of the invention, an automatic feature is provided for transferring control from between the low power control system to a high power control system of any conventional design in which the feedwater flow rate is regulated primarily by control of the main feedwater valves 52.

In accordance with this aspect of the invention, a position signal (or demand signal) 118 from the main feedwater valve is delivered to filter 120 and a gain circuit 122, for addition or subtraction at summer 126, to the target flow signal 84''. Conceptually, the summer 126 operates to generate a decreasing signal 84' as the position signal 118 of the main feedwater valve increases, thereby decreasing the stroke of, and preferably eventually closing, the bypass valve. The main feedwater valve position signal 118' as delivered to the summer 126, is enabled only when the power signal 80 is in the range representing a transition in either direction, from the low to the high power operating regime. In the illustrated embodiment, with the low power regime spanning the range 0–15%, the power signal 80 passes through an enabled gate 124 only when the power signal 80 is in the range of about 10–25%. It should be appreciated that, when the power level exceeds 20%, no target flow signal 84 will pass through the limiter 94. Thus, in the power range of 20–25%, the negative signal at 84' from signal 118' (in the absence of signal 84"), drives the bypass valve to a nearly closed position. At this point, a light or other indication to the operator that the high power control system has properly taken effect, would also prompt the operator to disengage the low power control system which then automatically fully closes the bypass feedwater valve.

With respect to the automatic transfer between the low power and high power, or main feedwater control system, automatic transfer is allowed if the steam generator level is stable and the reactor power is within a predetermined range in the vicinity of 1 or 2%. During the transfer, the low power feedwater control system of the present invention will gradually ramp either the main or the bypass feedwater valve while the steam generator level is controlled by the other valve.

The manual transfer from startup to low power automatic control should proceed when the following three conditions have been met: the bypass feedwater regulating valve is operating in manual and is being used to maintain steam generator level, the main feedwater valves are closed to prevent leakage to the main feedwater control valve, and the steam generator level is at the level set print. Once the low power feedwater control system is in automatic operation, the main feedwater bock valves should remain closed.

To automatically transfer between the low and high power feedwater control systems, the following conditions should first be met: the reactor power and the steam generator levels should be between prescribed limits, the operator turns a switch (not shown) to initiate the transfer, the main feedwater valve is ramped up automatically with a signal from the low power feedwater control system, as a remote manual signal. As the main feedwater valve is ramped up, the low power control system automatically closes down the bypass valve. When the bypass feedwater valve demand signal reaches a predetermined position, the operator is informed that the feedwater valves have been transferred. The operator then switches the main feedwater station to automatic, thereby completing the transfer. The bypass feedwater is then automatically closed by the low power feedwater control system.

The transfer from high power to low power automatic control is essentially a reversal of the foregoing procedure. It should be noted that at least one of the feedwater valves is always in direct automatic control during the transfer. This allows for correction of any plant perturbations during the transfer.

It should be appreciated that, if desired, the low power system could be readily adapted to remain in place and operable during operation in the high power regime, wherein the bypass valve would remain either in the fully open position, or at an intermediate position dictated by the relative strengths of signals 118, and 90.

Figure 5:
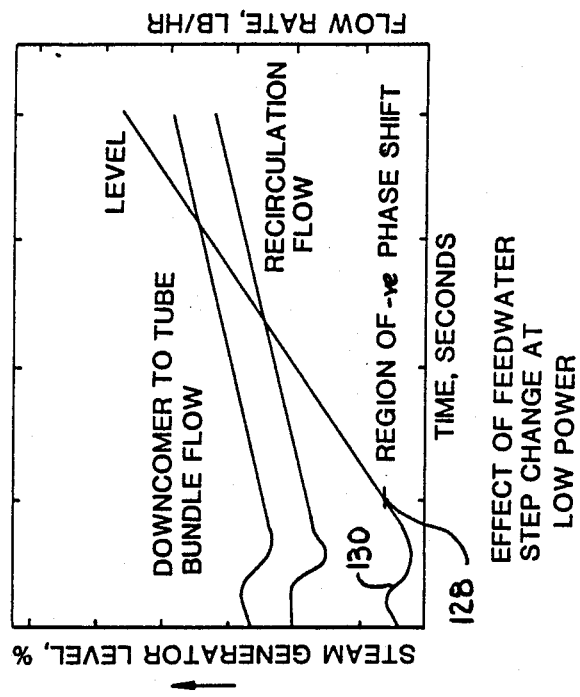
FIG. 5 is a graph showing the effect on steam generator water level of a feedwater flow step change at low power for a typical steam generator.
Figure 7:
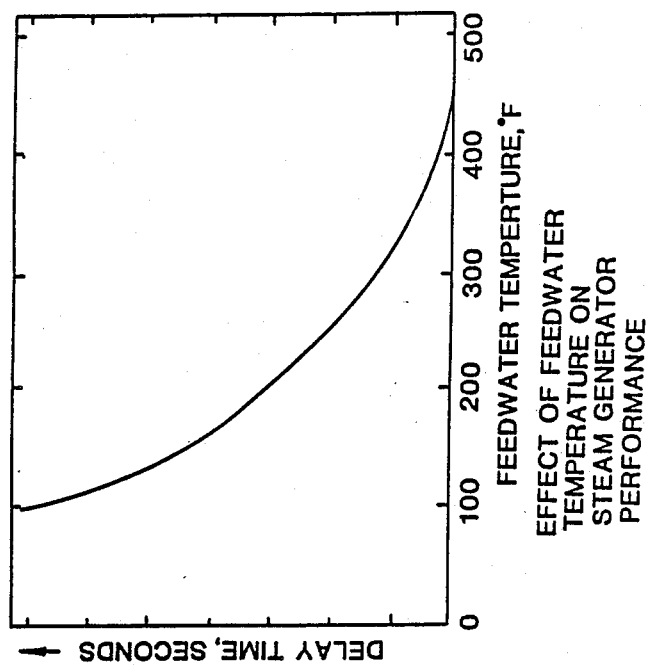
FIG. 7 is a graph illustrating the effect of feedwater temperature on steam generator performance, for the steam generator represented by FIG. 5.
Figure 8:
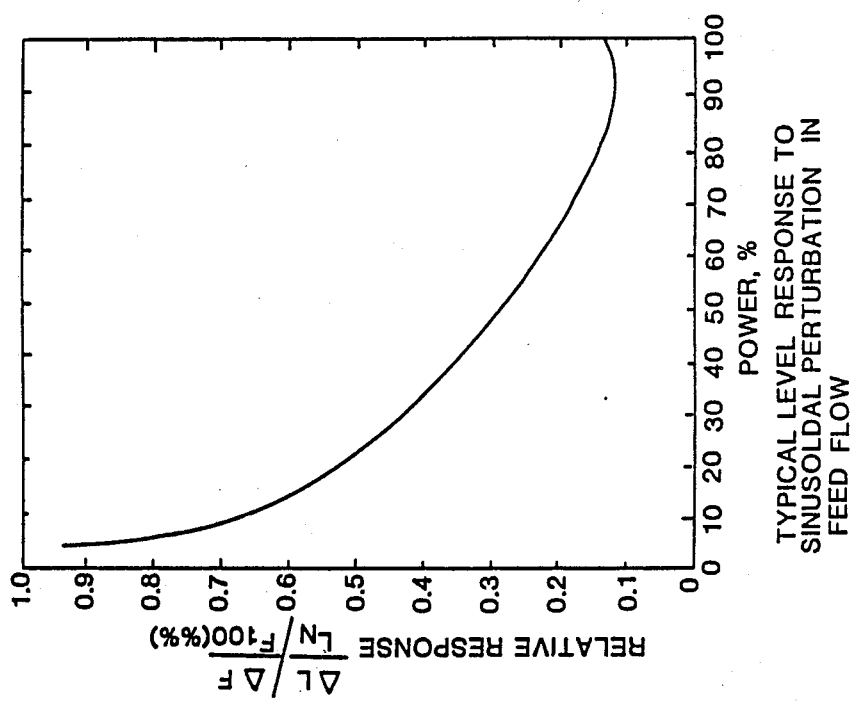
FIG. 8 is a graph showing a typical level response to sinusoidal perturbation in feedflow, for the steam generator represented by FIG. 5.

FIGS. 5–8 illustrate qualitatively the feed train and steam generator performance characteristics that are schematically represented in blocks 70 and 72 in FIG. 3, and which are utilized or compensated for, in the first, second, and third networks of FIG. 4. A particularly important characteristic is the apparently anomalous behavior of the steam generator level at the lower portion 130 of the curve, as shown in FIG. 5. FIG. 5 shows the effect of a feedwater step change at low power, where after a period of tim 128, referred to as tee delay time, the level returns approximately to the level at which the step change was initiated, and follows a well-behaved, substantially linear curve thereafter. As shown in FIG. 7, this delay time is dependent on the feedwater temperature, and it is such dependence on the feedwater temperature which is the basis for utilizing the temperature signal 78 in both the flow estimator functional block 82 and the gain functional block 114 of FIG. 4.

The characteristics of the type shown in FIGS. 5–8 are qualitatively similar for all pressurized water nuclear steam supplies systems utilizing recirculating steam generators, but the particular quantitative characteristics differ from plant to plant. Such characteristics may be quantified by performing tests on an operating system, but this is typically quite costly due to the associated outage time and the need for coordination of the plant staff and the developer of the control system. Preferably, the quantitative characteristics of the plant are obtained from a full plant, best-estimate computer program, such as an enhance version of the CEPAC Plant Analysis Computer Program available from Combustion Engineering, Inc. This program models the primary and secondary components of the nuclear steam supply system and the entire secondary feed train. The primary side model includes the reactor core with point kenetics, all coolant loops, pressurizer, and control systems. The secondary side models include a detailed representation of the steam generator thermal hydraulics, steam line, and steam bypass control system. The feed train model represents the fluid flow from the condenser to the steam generators, with all plant specific pumps, valves, controls and turbine extractions for feedwater heating. The model represents the shrink and swell phenomenon experienced at all powers with perturbation in steam flow, feedwater flow, and core power. Preferably, the steam generator model consists of nodes representing the downcomer, tube bundle, sub-cooled and boiling region, riser, and steam dome. Details of the steam generator process should also include phase separation in the tube bundle/riser regions, heat transfer from the tube bundle through the shroud to the downcomer, and condensation of steam by feedwater when the downcomer level is below the feed ring.

Figure 9:
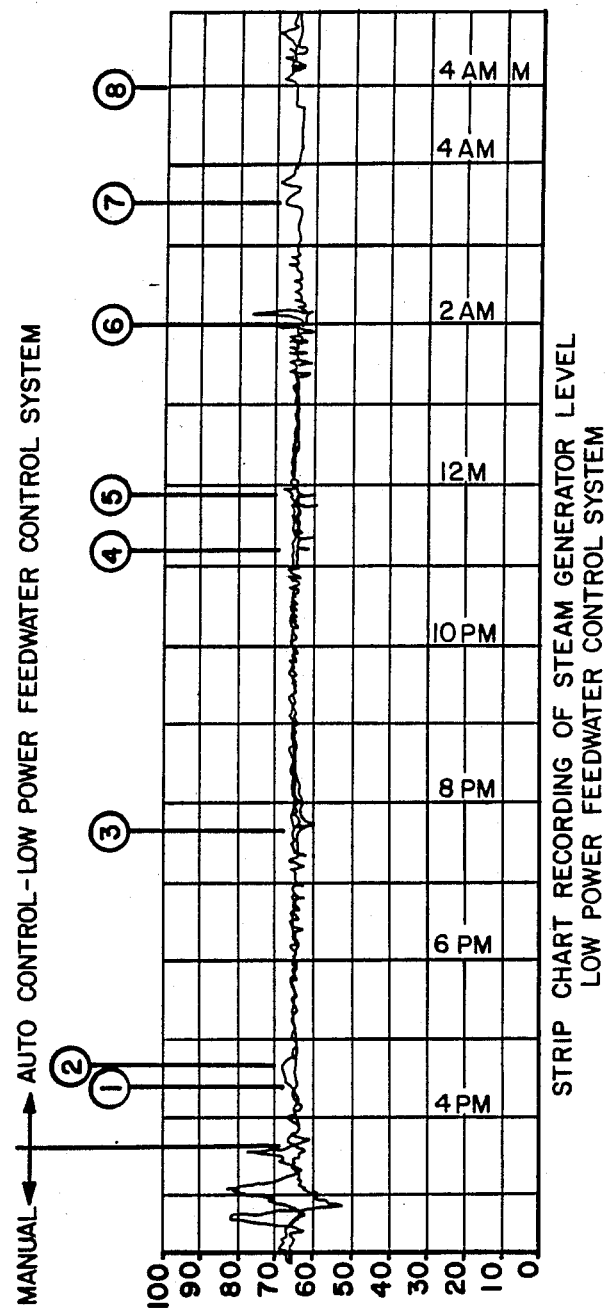
FIG. 9 depicts actual operation of the present invention during plant startup after a refueling outage.

It should be appreciated that, although the enhanced CEPAC Program was utilized by the inventors for determining the co-efficients in the control systems networks, similar computer programs are available from other vendors of nuclear steam supply systems, and from others who provide consulting and engineering services to owners of nuclear power plants FIG. 9 show the results of an actual startup of a nuclear steam supply system using the low power feedwater control system as described herein. This startup was performed following a refueling outage and thus the core had a positive moderator temperature co-efficient of reactivity. During startup procedures, the system had been operating successfully through two power ascensions from low power and a power reduction to low power.

FIG. 9 shows the steam generator level responses for two steam generators connected to a common nuclear reactor during the initial plant startup from a time when the plant was in manual operation. During manual operation, the steam generator levels were still oscillating. At 4:00 p.m., as indicated on the strip chart, the automatic low power feedwater control system (LPFCS) was put into operation.

A brief summary of the significant events, as shown in FIG. 9, follows:

Event 1: As a planned test of the LPFCS, the level setpoint of steam generator A was increased from 65 to 69% to determine the responsiveness of the steam generator level and a verification of the programmed setpoints. Reactor power was maintained at 4% power. As seen on the figure, the level in steam generator A accurately and quickly reached the new setpoint. The LPFCS accurately maintained the level of steam generator B at its unchanged 65% setpoint during this test.

Event 2: As a continuation of the test, the steam generator A level setpoint was decreased from 69 back to 65%. Steam generator level A response met all predicted criteria thereby eliminating any need for further tuning the LPFCS.

Events 2-3: Between Event 2 and 3, the reactor power was raised to about 10%. Secondary side perturbations including rapid closing and opening of atmospheric dump valves caused no significant perturbations in the levels.

Event 3: The main steam turbine was rolled to 500 rpm and tripped. The turbine trip override function in the safety system started to close the feedwater bypass valves. On resetting override, LPFCS took control and brought the steam generator levels to nominal. This is observed as a small level decrease at point 3 in the figure.

Events 4-5: Two attempts were made to bring the turbine on line at each of points 4 and 5 on the figure. Faulty turbine instrumentation caused turbine trips after the turbine had picked up about 15 and 25 MWE load. The LPFCS restored level to normal setpoint.

Event 6: The turbine generator was synchronized to the electric grid. The reactor power was at 10% an the turbine initially at 0%. A large load exceeding 10% was then picked up by the turbine causing the steam bypass valves to go completely closed for about 7 minutes. Primary temperatures dropped almost eight degrees before reactor power was raised about 5.3% in four minutes. The LPFCS was able to keep the steam generator levels well within operating band during this severe transient. Steam generator levels for both steam generators were restored rapidly to normal after the transient. This transient could have tripped the reactor if the LPFCS was unavailable. The consequence would have been approximately five to eight hours lost from critical path time.

Event 7: The main feedwater block valves were opened. Due to leakage in the main feedwater valves, excess feedwater was fed into the steam generators. The LPFCS compensated for this and restored level to normal.

Event 8: The LPFCS was transferred from the low power to the high power feedwater control system without any major perturbation.

The overall observation of this experience was a significant improvement in the stability of both the primary and secondary plant controlled parameters. Normally during power ascension reactor operators are required continuously to manually adjust feedwater flow rate in response to fluctuating steam generator levels. With the LPFCS in automatic mode the operators were completely freed from this task. Additionally, the difficult task of coordinating activities between the reactor panel operator and the feedwater panel operator during all operations was eliminated. The reactor panel operator was in effect, able to control the entire plant with reactor control functions leading and the secondary plant parameters following in automatic control.

It should thus be appreciated that the invention as described is well suited to accomplish the objectives set out above and that variations may be made to the preferred embodiment without departing from the scope of the invention.

I claim:

1. In a pressurized water nuclear reactor steam supply system having a circulating steam generator including a feedwater pump, a main feedwater valve and a bypass feedwater valve having a lower flow capacity than that of the mainfeed water valve, a method for controlling the water level in the steam generator during operation in a low power regime spanning the range of about 0 to 15% of full power and excluding controlling water level during refilling of the steam generator immediately following a reactor trip, comprising the steps of:
   generating a level signal commensurate with the water level in the steam generator;
   generating a temperature signal commensurate with the feedwater temperature;
   generating a power signal commensurate with the reactor power;
   from the power signal and the temperature signal, forming a target flow signal corresponding to the feedwater flow rate that would produce a stable steam generator water level for a steady state condition of said power signal and said temperature signal;
   comparing the level signal to a level signal setpoint and generating a level error signal;
   adjusting the level error signal by a gain factor that is dependent on the temperature signal, to produce an adjusted level error signal; and
   controlling the feedwater flow through the bypass valve in response to the target flow signal and the adjusted level error signal.

2. The method of claim 1 further including the step of limiting the target flow signal to a value corresponding to reactor power operation within twice the range of the low power operating regime.

3. The method of claim 1 wherein the step of adjusting the level error signal is preceded by the step of limiting the level error signal to a value corresponding to acceptable operation within the low power operating regime.

4. The method of claim 1 wherein the step of measuring the reactor power includes the step of measuring the nuclear reactor neutron flux.

5. The method of claim 1 wherein the step of adjusting the level error signal includes increasing the gain factor as the feedwater temperature increases.

6. The method of claim 1 further including the steps of:
   generating a main valve position signal indicative of the position of the main feedwater valve;
   generating an enable signal when the power signal is within a transition range that includes a portion of the low power regime and a portion of the higher power regime; and
   when the enable signal is generated, controlling the feedwater flow through the bypass valve in response to the target flow signal, the adjusted level error signal, and the main valve position signal.

7. The method of claim 2 wherein the step of limiting the target flow signal limits the signal to a value within the range of about 0-20% of the reactor power.

8. The method of claim 2 further including the step of passing the target flow signal through a first adaptive network after the step of limiting the target flow signal, the LaPlace transform co-efficients in said first adaptive network being functions of said power signal.

9. The method of claim 3 further including the step of passing the level signal through a second adaptive network and passing the level error signal through a third adaptive network, before the step of adjusting the error signal, wherein the LaPlace transform co-efficients in the second and third adaptive networks are functions of the level signal.

10. The method of claim 3 further including the step of limiting the target flow signal to a value corresponding to reactor power operation within twice the range of the low power operating regime.

11. The method of claim 6 wherein at a predetermined power level above the lower power regime, the step of controlling the feedwater flow includes closing the bypass valve.

12. The method of claim 10 further including the step of passing the target flow signal through a first adaptive network after the step of limiting the target flow signal, the LaPlace transform co-efficients in said first adaptive network being functions of the power signal.

13. The method of claim 12 further including the step of passing the level signal through a second adaptive network and passing the level error signal through a third adaptive network, before the step of adjusting the error signal, wherein the LaPlace transform co-efficients in the second and third adaptive networks are functions of the level signal.

14. The method of claim 10 wherein the step of adjusting the level error signal includes increasing the gain factor as the feedwater temperature increases.

15. The method of claim 14 wherein the step of limiting the target flow signal limits the signal to a value within the range of about 0-20 of the reactor power.

16. The method of claim 10 further including the steps of:
generating a main valve position signal indicative of the position of the main feedwater valve;
generating an enable signal when the power signal is within a transition range that includes a portion of the low power regime and a portion of the higher power regime; and
when the enable signal is generated, controlling the feedwater flow through the bypass valve in response to the target flow signal, the adjusted level error signal, and the main valve position signal.

17. The method of claim 16 wherein at a predetermined power level above the lower power regime, the step of controlling the feedwater flow includes closing the bypass valve.

18. In a pressurized water nuclear reactor steam supply system having a circulating steam generator including a feedwater pump, a main feedwater valve and a bypass feedwater valve having a lower flow capacity than that of the main feedwater valve, a method for controlling the water level in the steam generator during operation in a low power regime spanning the range of about 0 to 15% of full power and excluding controlling water level during refilling of the steam generator immediately following a reactor trip, comprising the steps of:
generating a level signal commensurate with water level in the steam generator;
generating a temperature signal commensurate with the feedwater temperature;
generating a power signal commensurate with the reactor power;
comparing the level signal to a level signal setpoint and generating a level error signal;
adjusting the level error signal by a gain factor that is dependent on the temperature signal, to produce an adjusted level error signal; and
controlling the feedwater flow through the bypass valve in response to the power signal and the adjusted level error signal.

19. The method of claim 18 further including the step of limiting the power signal to a value corresponding to reactor power operation within twice the range of the low power operating regime.

20. The method of claim 19 wherein the step of limiting the power signal limits the signal to a value within the range of about 0-20% of the reactor power.

21. The method of claim 18 further including the step of forming a target flow signal from the power signal, the target flow signal being commensurate with the long term feedwater flow rate requirements corresponding to a steady state condition of the measured reactor power, and wherein the step of controlling the feedwater flow includes controlling the flow in response to the target signal and the adjusted level error signal.

22. The method of claim 21, wherein the step of adjusting the level error signal is preceded by the step of limiting the level error signal to a value corresponding to acceptable operation within the low power operating regime.

23. The method of claim 22 further including the step of passing the level signal through a second adaptive network and passing the level error signal through a third adaptive network, before the step of adjusting the error signal, wherein the LaPlace transform co-efficients in the second and third adaptive networks are functions of the level signal.

24. The method of claim 22, further including the step of limiting the target flow signal to a value corresponding to reactor power operation within twice the range of the low power operating regime.

25. The method of claim 24, further including the step of passing the target flow signal through a first adaptive network after the step of limiting the target flow signal, the LaPlace transform co-efficients in said first adaptive network being functions of the power signal.

26. The method of claim 25, further including the step of passing the level signal through a second adaptive network and passing the level error signal through a third adaptive network, before the step of adjusting the error signal, wherein the LaPlace transform co-efficients in the second and third adaptive networks are functions of the level signal.

27. The method of claim 24, wherein the step of adjusting the level error signal includes increasing the gain factor as the feedwater temperature increases.

28. The method of claim 27, wherein the step of limiting the target flow signal limits the signal to a value within the range of about 0-20% of the reactor power.

29. The method of claim 21, further including the steps of:
generating a main valve position signal indicative of the position of the main feedwater valve;
generating an enable signal when the power signal is within a transition range that includes a portion of the low power regime and a portion of the higher power regime; and when the enable signal is generated, controlling the feedwater flow through the bypass valve in response to the target flow signal, the adjusted level error signal, and the main valve position signal.

30. The method of claim 29, wherein at a predetermined power level above the lower power regime, the step of controlling the feedwater flow includes closing the bypass valve.

31. Tee method of claim 21, wherein the step of adjusting the level error signal includes increasing the gain factor as the feedwater temperature increases.

* * * * *

UNITED STATES PATENT AND TRADEMARK OFFICE
CERTIFICATE OF CORRECTION

PATENT NO. : 4,912,732
DATED : Mar. 27, 1990
INVENTOR(S) : Gurdip Singh

It is certified that error appears in the above-identified patent and that said Letters Patent is hereby corrected as shown below:

Column 11, line 3 of claim 15, after "20" insert --%-- .

Column 14, line 1 of claim 31, "Tee" should be --The-- .

Signed and Sealed this

Thirty-first Day of March, 1992

Attest:

HARRY F. MANBECK, JR.

*Attesting Officer*  *Commissioner of Patents and Trademarks*